United States Patent [19]

Bartelt et al.

[11] Patent Number: 5,114,120
[45] Date of Patent: May 19, 1992

[54] PIVOTABLE EXTRAVEHICULAR EQUIPMENT MOUNTING SYSTEM

[75] Inventors: Robert D. Bartelt, Merton; William W. Belson, III, Nashotah, both of Wis.; Michael R. Bruno, 3950 Southwood Dr., Oconomowoc, Wis. 53066

[73] Assignee: Michael Roman Bruno, Oconomowoc, Wis.

[21] Appl. No.: 437,791

[22] Filed: Nov. 16, 1989

[51] Int. Cl.⁵ .............................................. B66D 1/00
[52] U.S. Cl. ................... 254/323; 224/42.44; 37/231; 74/483 R
[58] Field of Search .......... 224/42.08, 42.44, 42.45 R, 224/42.21; 414/921, 462, 543; 254/268, 323, 330, 329; 37/237, 234, 235, 236, 283, 266, DIG. 1, 117.5; 296/65.1; 74/483 R

[56] References Cited

U.S. PATENT DOCUMENTS

| | | | |
|---|---|---|---|
| 3,422,553 | 1/1969 | Holloway | 37/231 |
| 3,458,073 | 7/1969 | Dawson | 224/42.08 |
| 3,529,737 | 9/1970 | Daugherty | 224/42.08 |
| 3,829,064 | 8/1974 | Jackson | 254/323 |
| 3,837,513 | 9/1974 | Adamek | 414/462 |
| 4,018,424 | 4/1977 | Latimer | 254/323 |
| 4,049,238 | 9/1977 | Brown | 254/323 |
| 4,213,729 | 7/1980 | Cowles et al. | 224/42.08 |
| 4,221,311 | 9/1980 | Penn | 224/42.08 |
| 4,331,323 | 5/1982 | Sekimori et al. | 254/323 |
| 4,369,590 | 1/1983 | Miller | 37/231 |
| 4,695,218 | 9/1987 | Boyer | 224/42.08 |

*Primary Examiner*—Linda J. Sholl
*Attorney, Agent, or Firm*—Whyte & Hirschboeck

[57] ABSTRACT

An equipment mounting system includes a fixed leg and a second leg pivotable thereon. Equipment mounted at the free end of the second leg is pivotable to a position which is clear of a motor vehicle access location. When the mounting system is locked in a closed position, the equipment is operable. Further, whenever the mounting system is not locked in a closed position, one or more disabling devices prohibit operation of the equipment.

8 Claims, 2 Drawing Sheets

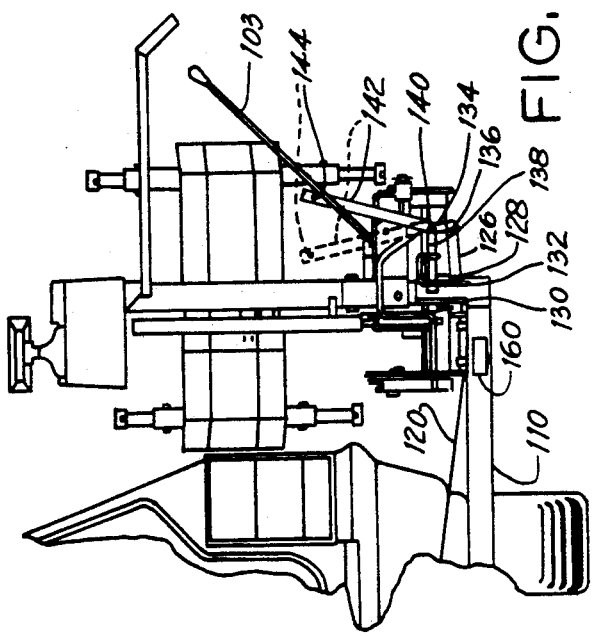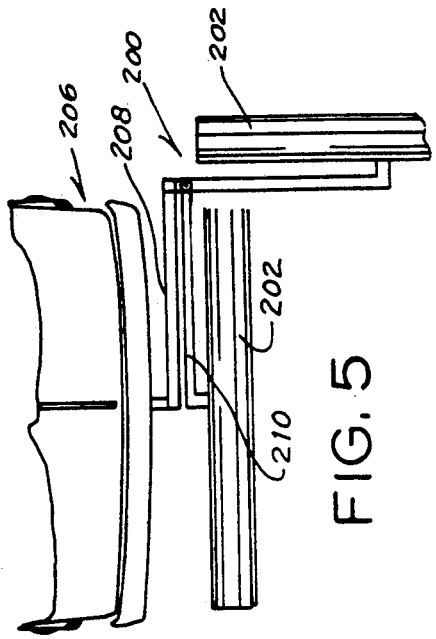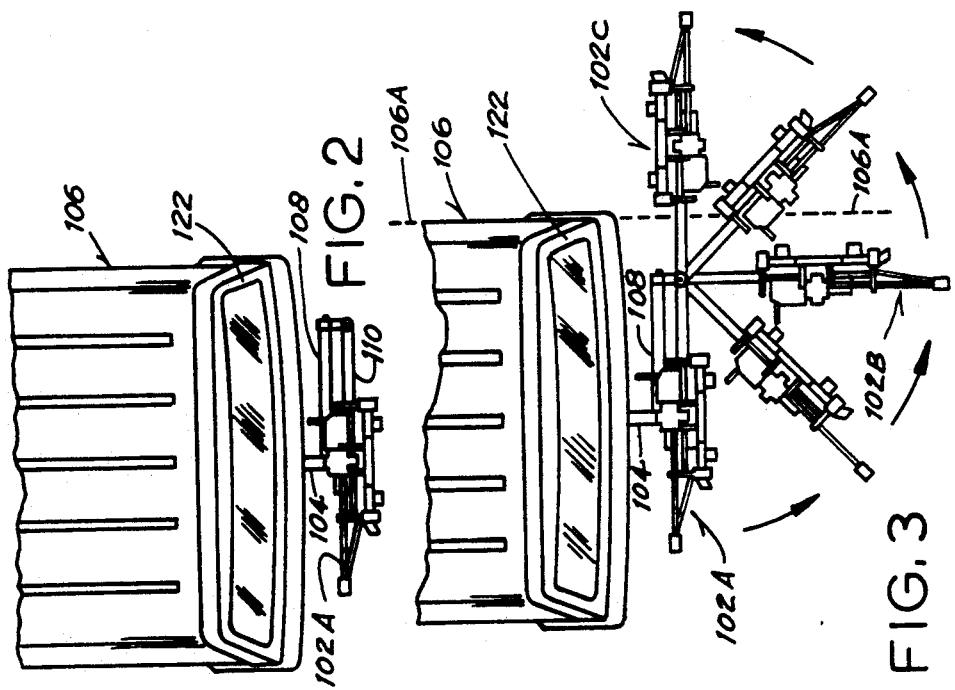

PIVOTABLE EXTRAVEHICULAR EQUIPMENT MOUNTING SYSTEM

BACKGROUND OF THE INVENTION

1. Field of the Invention

The present invention relates generally to motor vehicles and equipment mounted to the exterior thereof. More particularly, the present invention relates to a system designed to enable equipment mounted on the outside of a motor vehicle to swing away from the mounting point when access to the vehicle is necessary while, at the same time, protecting people in the area from undesired and/or inadvertent operation of the equipment when not properly secured to the mounting point. The present invention is adaptable to equipment such as that manufactured and sold by Bruno Independent Living Aids, Inc. of Oconomowoc, Wis.

2. Description of the Prior Art

In the past, heavy equipment which has been mounted to the outside of a vehicle (e.g., plows, hoists, winches, etc.) has been extremely difficult to work around when gaining access either to the interior of the vehicle through a rear or side door, or to the engine of the vehicle through the hood. If the equipment was especially difficult to work around, it was removed. This required dismounting and remounting the equipment which, in many cases, was time consuming and difficult to do unless more than one person assisted in the operation.

Such an operation is virtually impossible for a handicapped, elderly, or otherwise physically impaired individual to perform without assistance.

A mounting system which overcomes the above noted shortcomings of earlier systems would be a significant advancement in the art.

OBJECTS AND SUMMARY OF THE INVENTION

It is a primary object of the present invention to provide a pivotable equipment mounting system which allows an individual (including a handicapped or elderrly person) to move equipment mounted on the outside of a motor vehicle out of the way of access locations on the vehicle.

It is another object of the present invention to provide a pivotable extravehicular equipment mounting system which is adaptable to a number of locations on the vehicle.

It is a different object of the present invention to provide a pivotable extravehicular equipment mounting system which is adaptable to a number of different types of equipment.

It is still a different object of the present invention to provide a pivotable extravehicular equipment mounting system which is simple and easy to install in a variety of motor vehicles.

It is yet one other object of the present invention to provide a pivotable extravehicular equipment mounting system which prohibits operation of the mounted equipment unless the equipment mounting system is locked in a closed position.

How these and other objects of the present invention are accomplished will be explained in a detailed description of the preferred embodiment of the present invention in connection with the FIGURES. Generally, however, the objects of the invention are accomplished in a system for pivotably mounting equipment to the outside of a motor vehicle. The system includes a first, fixed leg, the first end of which is attachable to an anchoring point on a motor vehicle. A second, pivotable leg has a first end attached to the second end of the first leg, and a second end securable at the anchoring point near or at the first end of the first leg. In the closed position, the legs of the mounting system are parallel to one another and the second end of the second leg is immediately adjacent to the first end of the first leg. The two legs therefore form an angle of about 0° in the closed position. In the open position, the second leg is pivoted out to form an angle of about 180° with the first leg. A locking system located at the second end of the second leg can lock the system in its closed position. The locking system further includes a disabling mechanism or device to prohibit operation of equipment unless the system is locked in a closed position.

Other ways in which the objects are accomplished will become apparent to those presently of ordinary skill in the art after reviewing the specification.

DESCRIPTION OF THE DRAWINGS

FIG. 2 is a top plan view of the present invention in its closed and locked position.

FIG. 3 is a top plan view of the present invention showing the range of positions available.

FIG. 4 is a detailed view of the locking and disabling mechanism of the present invention.

FIG. 5 is a top schematic view of the present invention applied to a front end mounted snowplow.

In the FIGURES, like reference numerals refer to like components.

DETAILED DESCRIPTION OF THE PREFERRED EMBODIMENT

Figure 1:
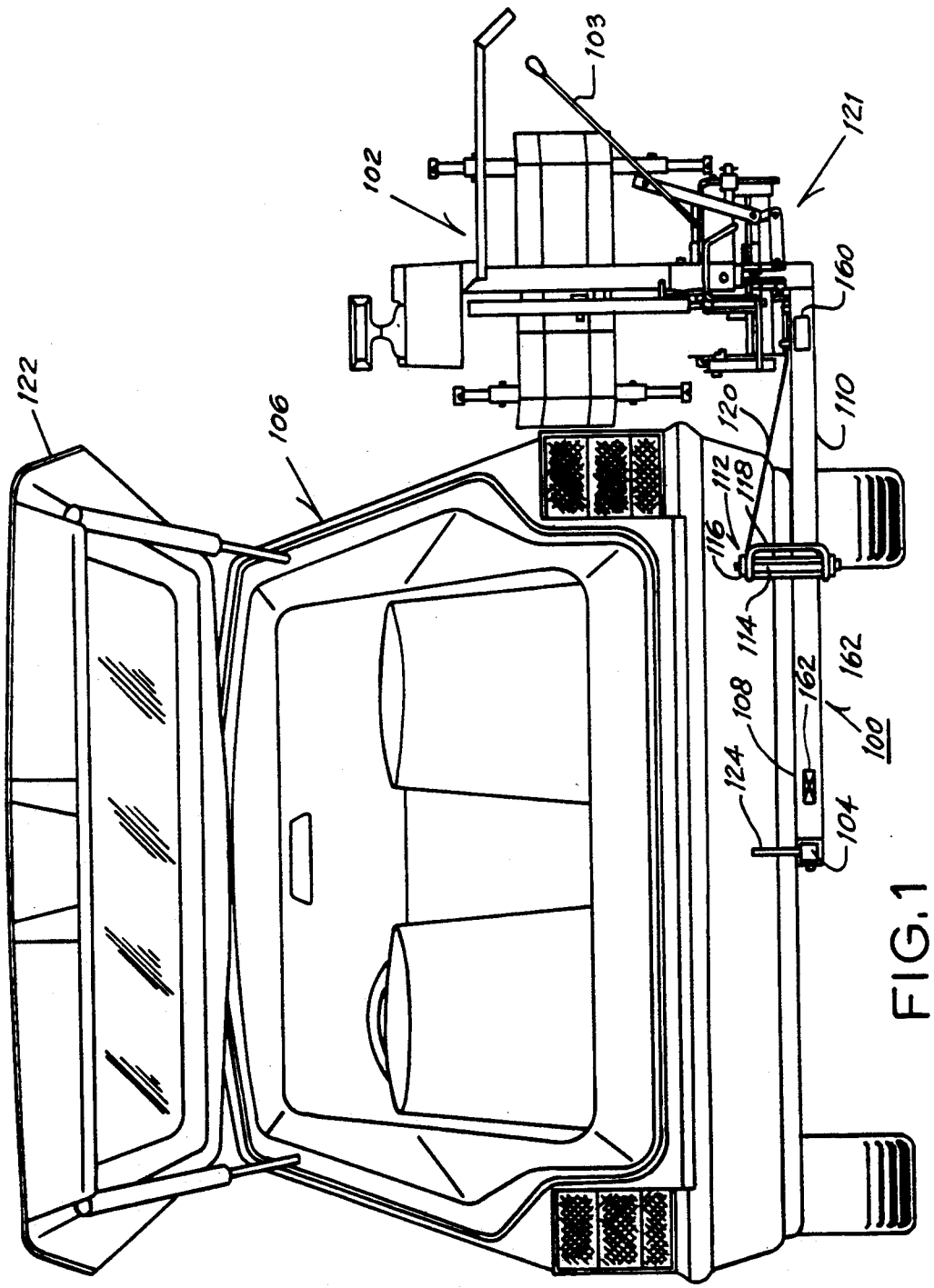
FIG. 1 is a plan view of the present invention in its open position.

The preferred embodiment of the present invention is generally shown in FIG. 1 with the mounting system 100 in its open position. FIG. 2 illustrates the preferred embodiment in a closed position; that is, locked to the vehicle 106 to permit operation of a hoist 102. The mounting system 100 in FIG. 1 is mounted to a frame hitch 104 of a mini-van type vehicle 106. It should be noted that the hoist and mini-van of FIG. 1 are used for illustrative purposes only and in no way restrict the application of the present invention to other types of motor vehicles and other types of equipment to be mounted at other points on motor vehicle.

Mounting system 100 consists of a first elongate leg 108 which is rigidly anchored to frame hitch 104 in the preferred embodiment. Other anchoring points on motor vehicles are known or will become apparent to those of ordinary skill in the art. Attached to leg 108 is a second, pivoting leg 110. In the preferred embodiment, legs 108, 110 are steel tubes which are rectangular in cross section. The legs 108, 110 are pivotably attached to one another by any sort of appropriate hinge apparatus 112. In the preferred embodiment, the hinge 112 includes a post 114 engaging a first bracket 116 which is attached by appropriate means, such as welding, to leg 108. A second bracket 118 is similarly attached to leg 110. Bracket 116 is mounted in a location and manner to avoid interfering with bracket 118 as it pivots.

Further, to add support to the system when leg 110 is in an open position (shown in FIg. 1), a support brace 120 is anchored at the top of post 114 and at the base of the hoist 102. Brace 120 is secured to leg 110 by appropriate means such as welding shown in FIG. 4.

As can be seen in FIG. 3, the hoist 102 and mounting system 100 therefor are capable of an infinite number of positions between the closed position shown in FIG. 2 and the open position shown in FIG. 1. In addition, the hoist 102 can pivot to a position 102C just outside the outer side edge 106A of the vehicle 106, thus permitting the opening of a vertically openable gate or other trunk type door 122, as shown in FIG. 3.

A locking mechanism 121 at the outer end of leg 110 serves two functions. First, the mechanism permits a user to securely lock leg 110 in a closed position shown in FIG. 2 and at 102A in FIG. 3. In this position, the locking mechanism 121 engages an anchoring post 124 located near or at the point where leg 108 is secured to the vehicle 106. Second, the locking mechanism 121 includes one or more disabling devices for equipment like hoist 102. The locking mechanism 121 disables or otherwise renders the mounted equipment inoperable unless the system 100 is in the closed position 102A and the locking mechanism is engaging anchoring post 124.

As can be seen in FIG. 4, the preferred embodiment of locking mechanism 121 consists of a lower stationary bar 126 secured to the second end of leg 110 by a bolt 128 or other appropriate means. Also secured to the second end of leg 110 are a pair of guides 130, 132, which guide the locking mechanism 121 into engagement with anchoring post 124 when system 100 is in a closed position.

Pivotably attached to bar 126 is a second bar 134 which pivots on a bolt 136 or other appropriate means in bar 126. An upper locking bar 138 is pivotably attached to bar 134, again by a bolt 140 or other appropriate means. Bar 138 is horizontally displaceable through a hole in guide 132, and guide 130, which also has a hole to accept bar 138 in its locking position.

Arm 142 is also mounted to bolt 140 and bars 134, 138. As shown in FIG. 4, arm 142 in its open position keeping bar 138 in its open position. Arm 142 has a pin 144 extending perpendicularly therefrom. In the open position shown in full lines in FIG. 4, arm 142 and pin 144 prevent the operator from actuating handle 103 in a counterclockwise direction to operate the hoist 102. When arm 142 is shifted counterclockwise to the position shown in dashed lines in FIG. 4, actuating handle 103 is free to be moved into its operating position. To further ensure disablement of hoist 102 when not locked and closed, an electrical proximity switch 160, 162 can be utilized. A detector 160 is located on arm 110. A magnetic enabling device 162 is located at a corresponding position on arm 108. A completed circuit allowing operation of the hoist can only be achieved when the system 100 is in a closed position. Therefore, using the combination of electrical and mechanical disabling devices, the disabling function is achieved. Other mechanical, electrical, etc. disabling mechanisms and systems will no doubt become apparent to those presently of ordinary skill in the art and the present invention is not limited to those shown in the preferred embodiment.

It should be noted that other disabling devices (mechanical, electrical, etc.) are adaptable to the present invention. Those of ordinary skill in the art will be aware of these other mechanisms to reduce the risk of accidental or inadvertent operation of any equipment (especially power equipment) when not in an operating position on a motor vehicle.

FIG. 5 schematically shows a similar mounting system 200 in use with a snow plow 202 attached to the front end of a vehicle 206. Once again, first leg 208 and second leg 210 are in pivoting engagement to permit access to the front end or engine compartment of the vehicle 206. FIG. 5 illustrates the adaptability of the present invention to be used with any vehicle mounted equipment such as hoists, winches, plows, etc.

If the vehicle mounted equipment is power operated, whatever locking mechanism is used can be adapted to disable the equipment when it is not anchored in a closed position to the vehicle. Similarly, hand operated equipment may also be rendered inoperable when the mounting system is in an open position.

Other variations, modifications and other applications of the present invention will become apparent to one presently of ordinary skill in the art after reviewing the specification in connection with the FIGURES. Therefore, the above description of the preferred embodiment is to be interpreted as illustrative rather than limiting. The scope of the present invention is to be limited solely by the scope of the claims which follow.

What is claimed is:

1. A system for pivotably mounting power equipment designed to be operated while mounted and locked to the outside of a motor vehicle, said system comprising the combination of:

a fixed leg having a first end rigidly securable to an anchoring point on a vehicle;

a pivotable leg having a first end pivotably attached to the second end of said fixed leg and having a second end securable to the first end of said fixed leg;

wherein said pivotable leg is movable between a closed position and an open position, further wherein when said pivotable leg is in said closed position, said legs form an angle of about 0° and are alongside one another, and further wherein when said pivotable leg is in said open position, said legs form an angle of about 180°;

means for locking said pivotable leg in said closed position;

disabling means permitting operation of said power equipment only when said pivotable leg is locked in said closed position.

2. The system of claim 1 wherein said disabling means comprises mechanical means to prevent operation of said equipment unless said pivotable leg is locked in said closed position.

3. The system of claim 2 wherein said locking means comprises a locking bar slidably mounted at the second end of said pivotable leg and an anchoring member secured to the first end of said fixed leg, wherein when said pivotable leg is in said closed position, said locking bar may slidably engage said anchoring member, thereby locking said pivotable leg in said closed position.

4. The system of claim 3 wherein said disabling means further comprises electromagnetic means which prevents operation of the power equipment unless said pivotable leg is in said closed position.

5. The system of claim 4 wherein said power equipment is a hoist designed to transport a load mounted to said vehicle.

6. The system of claim 4 wherein said power equipment is a plow.

7. A system for pivotably mounting a hoist to a motor vehicle, the hoist being designed to carry a vehicle usable by an individual with impaired mobility, said system comprising in combination:
   a) a fixed leg secured to the rear of the motor vehicle and having a first end and a second end;
   b) a pivotable leg having a first end pivotably attached to the second end of said fixed leg and having a second end to which said hoist is fixedly mounted;
   c) means for selectively and mechanically locking the first end of said fixed leg to the second end of said pivotable leg;
   d) means for disabling said hoist whenever said second end of said pivotable leg is not locked to the first end of said fixed leg.

8. In combination with a motor vehicle, a system for mounting a hoist to the motor vehicle, said hoist adaptable to raise, lower and transport a personal transportation vehicle for an individual with impaired mobility only when said hoist is in a locked position on the motor vehicle, said system including in combination:
   a) a fixed leg having a first end and a second end, the first end of said fixed leg securely mounted to the motor vehicle;
   b) a pivotable leg having a first end pivotably attached to the second end of said fixed leg and a second end having said hoist mounted thereto, said pivotable leg designed to pivot only in a horizontal plane;
   c) mechanical means for selectively locking the first end of said fixed leg to the second end of said pivotable leg, said mechanical locking means including a selectively slidable locking bar mounted at the second end of said pivotable leg and an anchoring member at the first end of said fixed leg, said locking bar being selectively engageable with said anchoring member;
   d) means for disabling said hoist when said pivotable leg is not locked to said fixed leg, said disabling means including mechanical means for selectively preventing operation of said hoist.

* * * * *